(12) United States Patent
Bouillon et al.

(10) Patent No.: US 8,263,504 B2
(45) Date of Patent: Sep. 11, 2012

(54) FIBER REINFORCING TEXTURE FOR MAKING A COMPOSITE MATERIAL PART

(75) Inventors: Eric Bouillon, Le Haillan (FR);
François Charleux, Bordeaux (FR);
Caroline Louchet-Pouillerie, Arsac (FR); Rémi Bouvier, Merignac (FR);
Dominique Coupe, Le Haillan (FR)

(73) Assignee: Snecma Propulsion Solide, Le Haillan (FR)

( * ) Notice: Subject to any disclaimer, the term of this patent is extended or adjusted under 35 U.S.C. 154(b) by 687 days.

(21) Appl. No.: 12/305,085

(22) PCT Filed: Jun. 20, 2007

(86) PCT No.: PCT/FR2007/051476
§ 371 (c)(1),
(2), (4) Date: May 11, 2009

(87) PCT Pub. No.: WO2007/148018
PCT Pub. Date: Dec. 27, 2007

(65) Prior Publication Data
US 2009/0280707 A1    Nov. 12, 2009

(30) Foreign Application Priority Data

Jun. 21, 2006   (FR) ...................................... 06 52572

(51) Int. Cl.
*D03D 3/00* (2006.01)
*D03D 3/06* (2006.01)
*D03D 11/00* (2006.01)
*F04D 29/30* (2006.01)

(52) U.S. Cl. ..... 442/205; 442/206; 442/207; 416/227 R; 416/230; 139/384 R; 139/386; 139/408

(58) Field of Classification Search .......... 442/205–207; 416/227 R, 230; 139/384 R, 386, 408–415
See application file for complete search history.

(56) References Cited

U.S. PATENT DOCUMENTS

| | | | |
|---|---|---|---|
| 4,922,969 A | | 5/1990 | Campman et al. |
| 5,102,725 A | * | 4/1992 | Knox et al. ................... 442/205 |
| 5,292,578 A | * | 3/1994 | Kolzer .......................... 442/189 |
| 5,490,602 A | | 2/1996 | Wilson et al. |
| 2002/0090873 A1 | | 7/2002 | Moody |
| 2003/0228815 A1 | | 12/2003 | Bhatnagar et al. |
| 2005/0084377 A1 | * | 4/2005 | Dambrine et al. ........ 416/223 R |

FOREIGN PATENT DOCUMENTS

| | | |
|---|---|---|
| EP | 0 439274 A | 7/1991 |
| JP | 10-338008 A | 12/1998 |
| JP | 2005 305276 A | 11/2005 |

* cited by examiner

*Primary Examiner* — Jenna Johnson
(74) *Attorney, Agent, or Firm* — Weingarten, Schurgin, Gagnebin & Lebovici LLP

(57) ABSTRACT

A fiber reinforcing texture (10) woven as a single part for fabricating a composite material part having an inner portion (12), or core, made by three-dimensional weaving with yarns made up from discontinuous fibers, and a portion (14, 16) adjacent to an outside surface, or skin, made by weaving with yarns made up from continuous filaments.

16 Claims, 8 Drawing Sheets

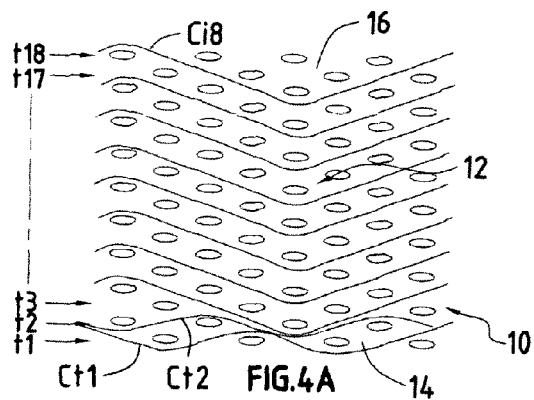
FIG.4A
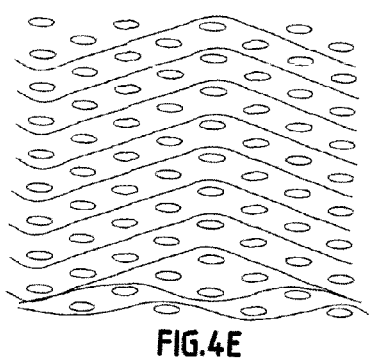
FIG.4E
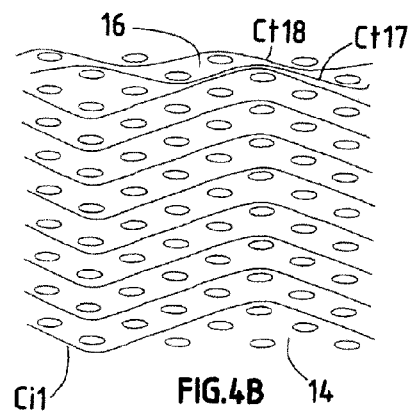
FIG.4B
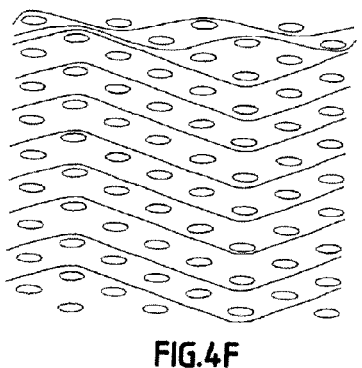
FIG.4F
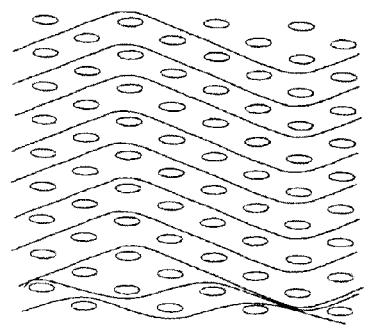
FIG.4C
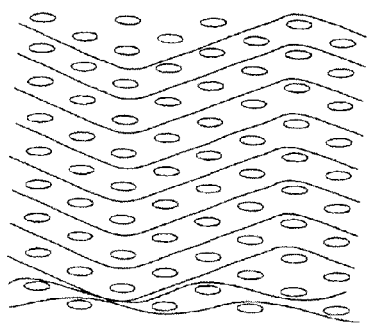
FIG.4G
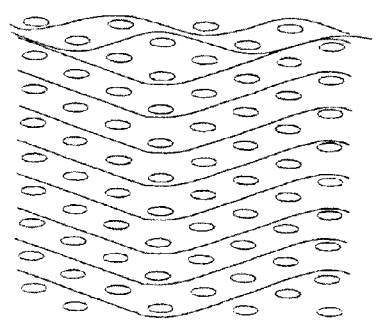
FIG.4D
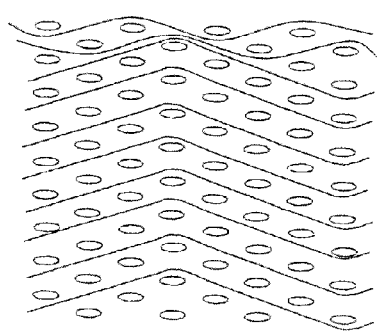
FIG.4H
FIG.4

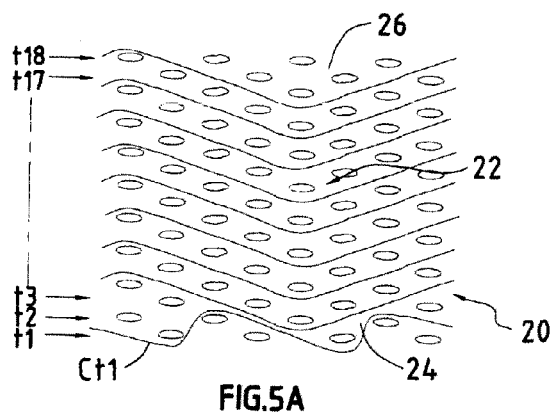
FIG.5A
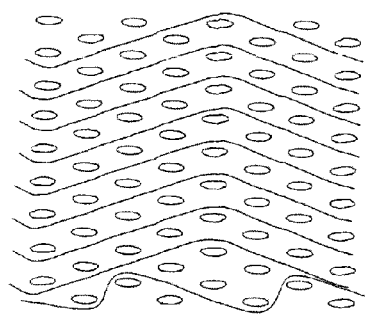
FIG.5E
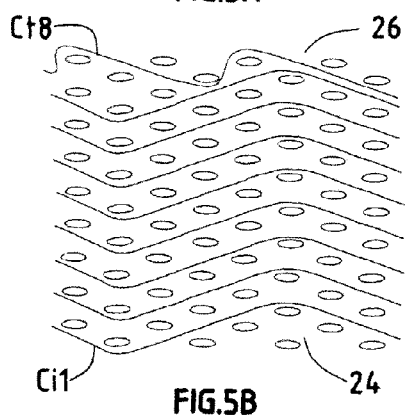
FIG.5B
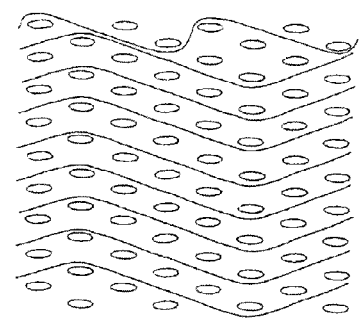
FIG.5F
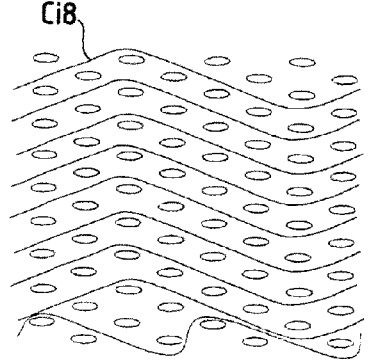
FIG.5C
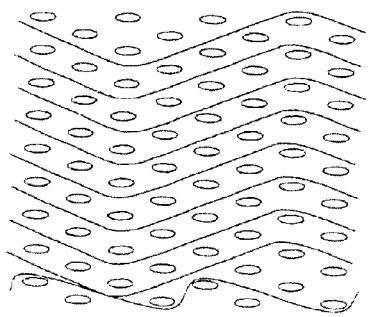
FIG.5G
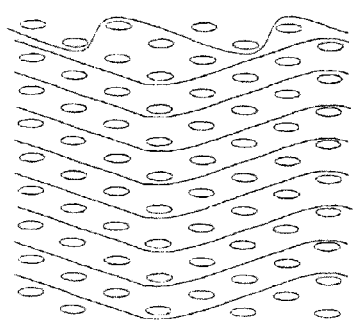
FIG.5D
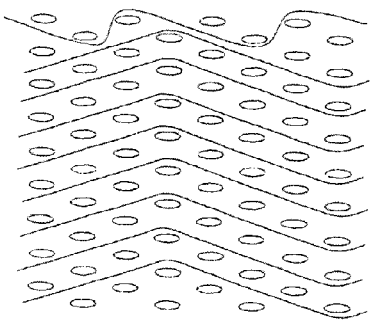
FIG.5H
FIG.5

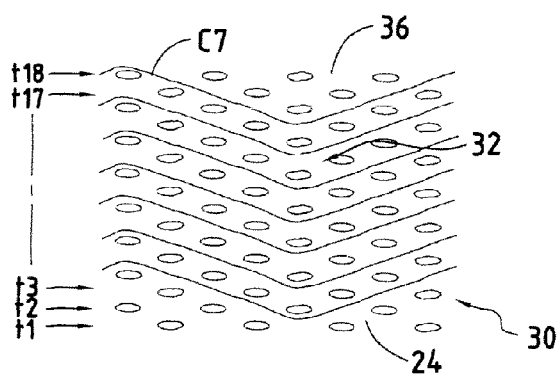
FIG.6A
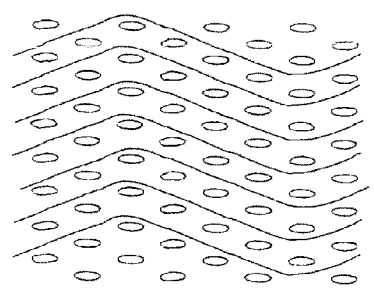
FIG.6E
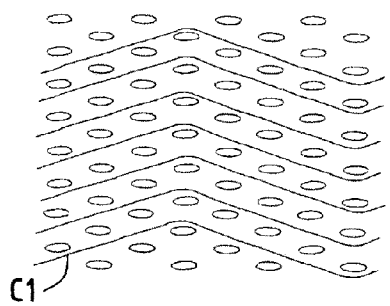
FIG.6B
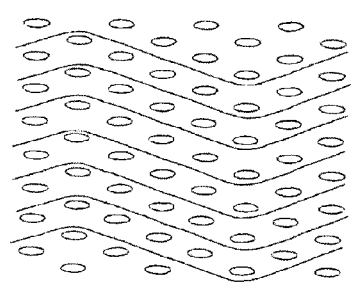
FIG.6F
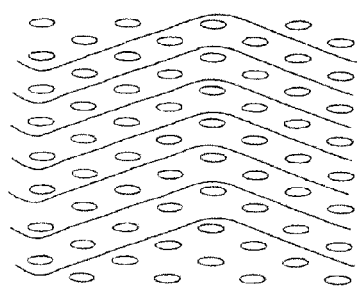
FIG.6C
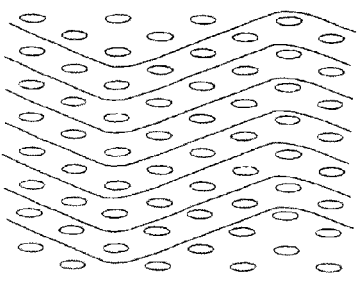
FIG.6G
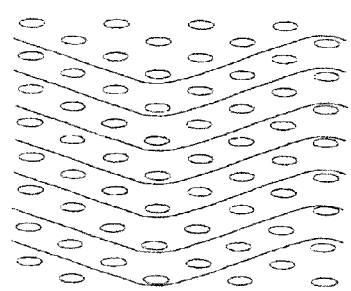
FIG.6D
FIG.6
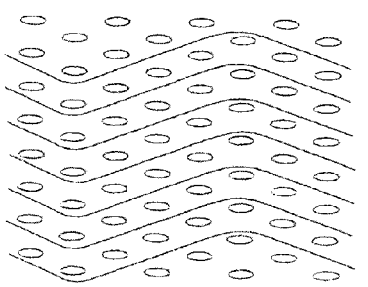
FIG.6H FIG.7
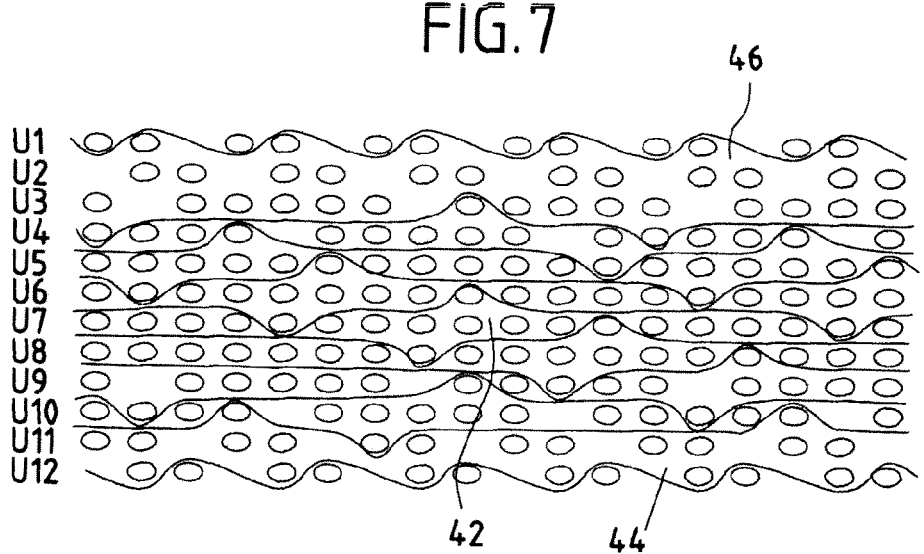
FIG.7A
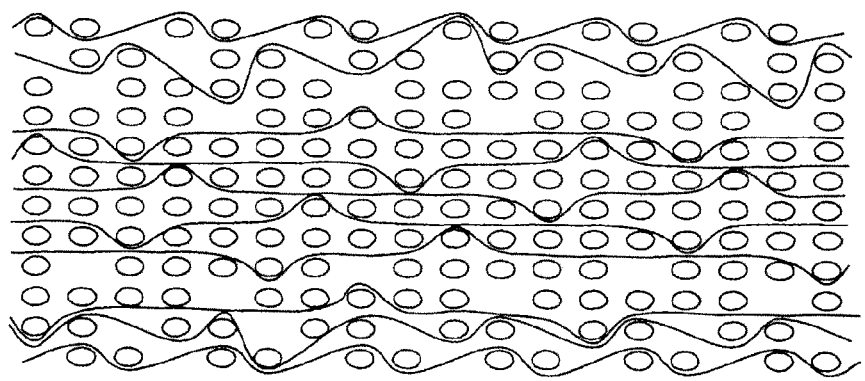
FIG.7B
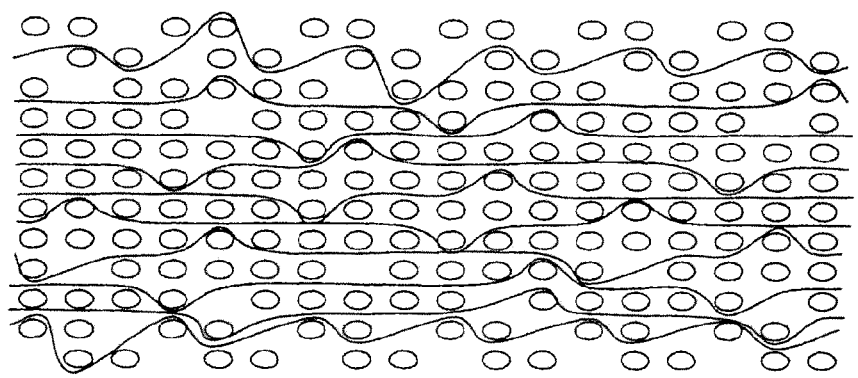
FIG.7C

← 40

← 40

← 40

← 40

← 40

← 40

↙ 40

↙ 40

↙ 40

FIBER REINFORCING TEXTURE FOR MAKING A COMPOSITE MATERIAL PART

BACKGROUND OF THE INVENTION

The invention relates to making composite material parts and particularly to making fiber reinforcing textures for such parts.

The field of application of the invention is more particularly making thermostructural composite material parts, i.e. parts made of a material having mechanical properties that make it suitable for constituting structural elements and having the ability to conserve these properties at high temperatures. Thermostructural composite materials are typically carbon/carbon (C/C) composite materials having carbon fiber reinforcement densified by a carbon matrix, and ceramic matrix composite (CMC) materials having refractory fiber reinforcement (carbon fiber or ceramic fiber) densified by a ceramic matrix. Thermostructural composite material parts are used in particular in the fields of aviation and space.

For parts made of composite material that present a certain thickness, it is common practice to make the reinforcing texture out of a plurality of superposed layers that are bonded together so as to avoid the layers separating, in particular by performing three-dimensional weaving.

Furthermore, in particular for a composite material part that is obtained by densifying the fiber reinforcing texture by chemical vapor infiltration (CVI), it can be useful to provide easy access for the gas to the core of the fiber texture or to ensure that the fiber texture presents porosity that is relatively uniform in order to achieve densification that departs as little as possible from being uniform. In the event of access being difficult to the pores in the fiber texture, or in the presence of pores of very different sizes, then the smaller pores become filled in more quickly and a strong densification gradient is inevitable, thereby affecting the properties of the composite material.

Document EP 0 489 637 proposes making a fiber reinforcing texture for a thermostructural composite material part by using a yarn made up from discontinuous fibers with substantially no twist, yarn cohesion being provided by a covering yarn. The texture can be made by three-dimensional weaving. The covering yarn is made of a temporary or sacrificial material that is eliminated after weaving, thereby allowing the discontinuous filaments to bulk up, which enhances subdivision of the pores of the woven texture and, in combination with three-dimensional weaving, encourages access for the gas to the core of the fiber structure during subsequent densification by CVI.

Nevertheless, when fabricating composite material parts that are to present a surface state that is very smooth, it is necessary to trim the surface after an initial stage of partial densification, also known as a consolidation stage, in order to eliminate the irregularities created at the surface by the bulking up of the discontinuous filaments that are released once the covering yarn is eliminated. It can also be necessary to add a ply of two-dimensional cloth prior to continuing densification in order to obtain a desired surface state.

OBJECT AND SUMMARY OF THE INVENTION

An object of the invention is to remedy the drawbacks represented by those additional operations, and more generally to propose a fiber texture for constituting reinforcement in a composite material part and satisfying constraints concerning easy infiltration by a gas during CVI densification and constraints concerning the appearance and/or the particular properties desired for the resulting part.

This object is achieved with a fiber texture for reinforcing a composite material part, the fiber texture being woven as a single part and having an inner portion, or core, and a portion adjacent to an outside surface, or skin, wherein texture the core is made by three-dimensional weaving with yarns that are made up, at least in the majority, from discontinuous fibers, and the skin is made by weaving with yarns made up from continuous filaments.

Densification of the fiber texture by CVI is thus encouraged all the way to the core, while avoiding a steep densification gradient between the core and the skin, while at the skin a surface state is preserved that is free from significant irregularities.

In an embodiment, the core is made by interlock weaving, thereby providing easier access for the gas to the core of the preform, while the skin is made by weaving with a plain, satin, or twill type weave, thus serving to limit surface irregularities. The weaving of the skin may comprise 2D weaving, with the interlock weaving providing the interlacing between the weft layers all the way to the skin, or the weaving of the skin may comprise multi-layer 3D weaving.

In another embodiment, the core and the skin may be made by multi-layer 3D weaving using different weaves, for example a satin type weave in the core portion and a plain or twill type weave in the skin portion. A plain type weave in the skin gives easier access to gas through the skin compared with a satin type weave and thus encourages CVI densification all the way to the core.

In yet another embodiment, the skin is made with a structure having a lower count than the structure with which the core is made, thereby providing easier access for the gas through the skin towards the core of the preform.

It is possible to vary simultaneously the 3D weaving technique and the structure between the core and the skin.

It is also possible to form the various portions of the fiber texture with yarns of different chemical natures so as to give them particular desired properties, in particular resistance to wear or to oxidation.

The weaving of the core portion may be performed with yarns that are made up from discontinuous fibers with substantially no twisting and at least one sacrificial covering yarn that provides the yarn with cohesion.

The invention also provides a composite material part having a fiber reinforcing texture as defined above that is densified by a matrix.

BRIEF DESCRIPTION OF THE DRAWINGS

The invention can be better understood on reading the following description made with reference to the accompanying drawings, wherein:

FIGS. 4A to 4H show different successive weave planes of a fiber reinforcing texture in a first embodiment of the invention;

FIGS. 5A to 5H show different successive weave planes of a fiber reinforcing texture in a second embodiment of the invention;

FIGS. 6A to 6H show different successive weave planes of a fiber reinforcing texture in a third embodiment of the invention; and FIGS. 7A to 7L show different weave planes of a fiber reinforcing texture in a fourth embodiment of the invention.

DEFINITIONS

The term "continuous filament" is used herein in conventional manner to designate fiber elements that are of very great length relative to their diameter. Thus, by way of example, in a reinforcing texture constituting a preform for a composite material part and made from continuous filaments, at least a very large majority of them extend continuously in the preform, being interrupted only at the geometrical boundaries of the preform. With continuous filaments that are not natural, they are conventionally obtained by spinning a synthetic material, possibly followed by one or more physico-chemical operations (stretching, oiling, heat treatment, . . . ).

Yarns made up from continuous filaments, or multifilament yarns, are formed by assembling together continuous filaments side by side, with or without twisting.

The term "discontinuous fibers" is used herein in conventional manner to designate fiber elements that, for fibers that are not natural, are formed by cutting or stretch-breaking continuous filaments. Discontinuous fibers or short fibers generally have a length of a few millimeters to a few tens of millimeters.

Yarn made up from discontinuous fibers, or "fiber yarn", is made by assembling discontinuous fibers together by twisting or by covering, where covering consists in providing cohesion by winding a covering yarn around an assembly of discontinuous fibers that need not be twisted or that may be twisted only slightly.

The term "two-dimensional weaving" or "2D weaving" is used herein to designate a conventional weaving technique in which each warp yarn passes from one side to the other of yarns in a single weft layer.

The term "three-dimensional weaving" or "3D weaving" is used herein to designate a weaving technique in which at least some of the warp yarns interlace weft yarns in a plurality of weft layers, thereby bonding them together.

Figure 1:
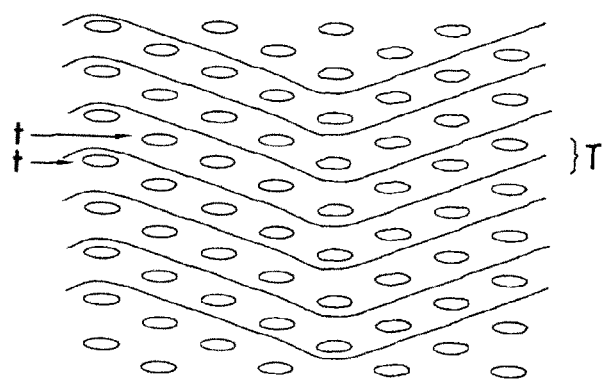
FIGS. 1 to 3 show interlock and multi-layer three-dimensional weaves.

The term "interlock weaving" is used herein to designate a 3D weave in which each warp layer interlaces a plurality of weft layers with all of the yarns of a given warp column having the same movement in the weave plane. FIG. 1 is a view of one of eight planes of an interlock weave having seven warp layers and eight weft layers. In the interlock weave shown, a weft layer T is made up of two adjacent weft half-layers t that are offset from each other in the warp direction. There are thus 16 weft half-layers in a staggered configuration. Each warp interlaces three weft half-layers. Below, the term "layer" is used either to designate a complete layer of weft yarns or a half-layer of weft yarns, unless specified to the contrary.

It is also possible to adopt a weft configuration that is not staggered, with the weft yarns of two adjacent weft layers being aligned on the same columns.

Figure 2:
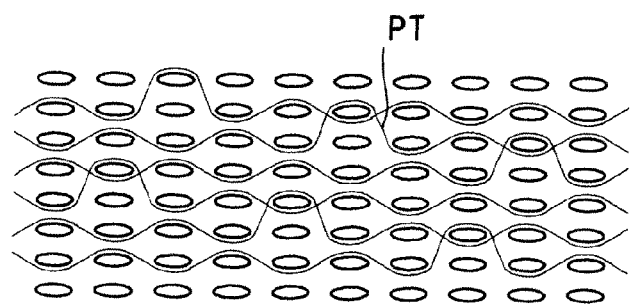

The term "multilayer weaving" is used herein to designate 3D weaving with a plurality of weft layers in which the basic weave of each layer is equivalent to a conventional 2D weave, such as a weave of the plain, satin, or twill type, but with certain points of the weave interlacing the weft layers to one another. FIG. 2 shows a plane of multilayer cloth of the plain type, or "multiple-plain cloth" in which the warp yarns are deflected from time to time from their conventional 2D weave path associated with one weft yarn to take hold of a yarn of an adjacent weft yarn and form particular interlacing points PT interlacing two adjacent weft layers. At a particular interlacing point PT, the warp yarn passes around two weft yarns situated in the same column in two adjacent weft layers.

Figure 3:
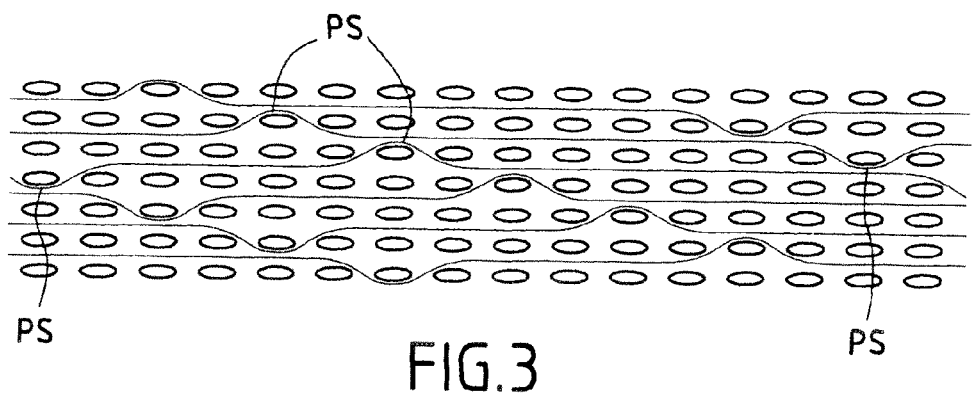
Figure 7D:
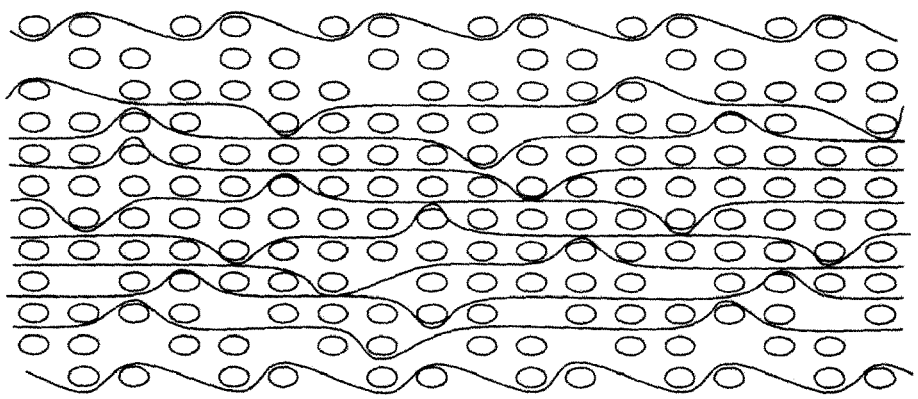
Figure 7E:
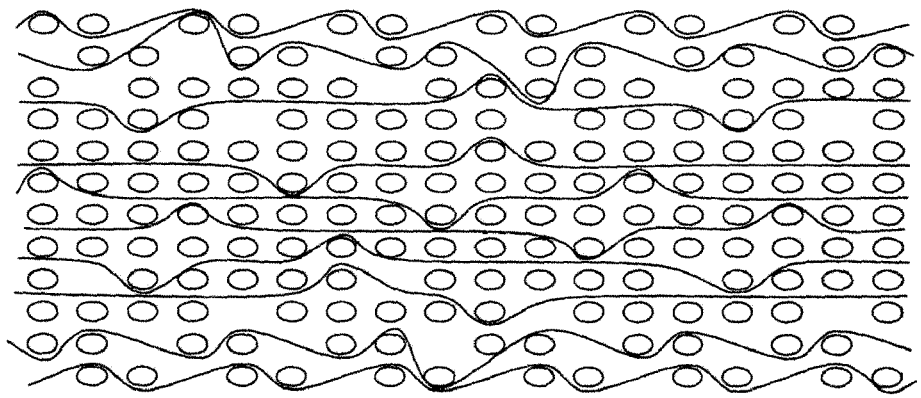
Figure 7F:
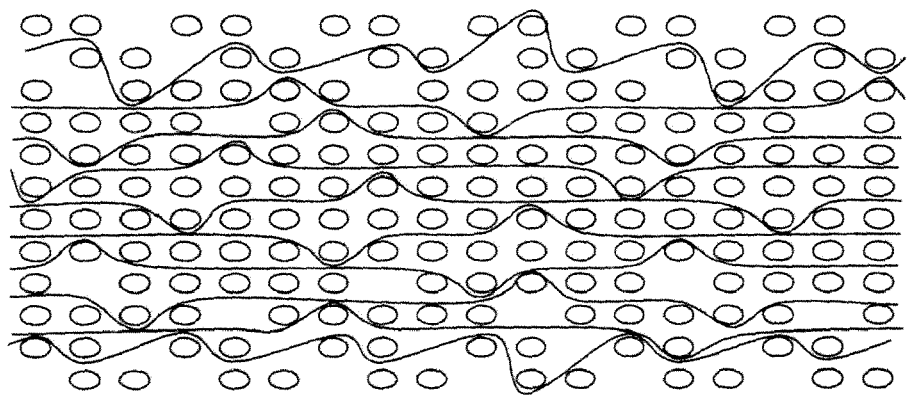
Figure 7G:
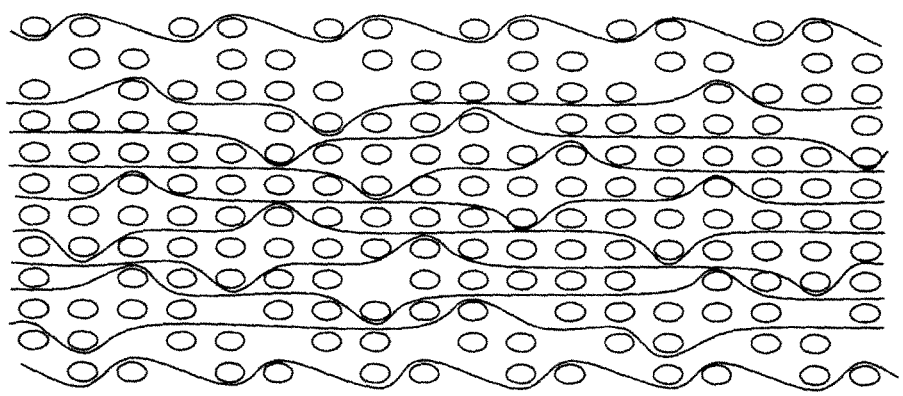
Figure 7H:
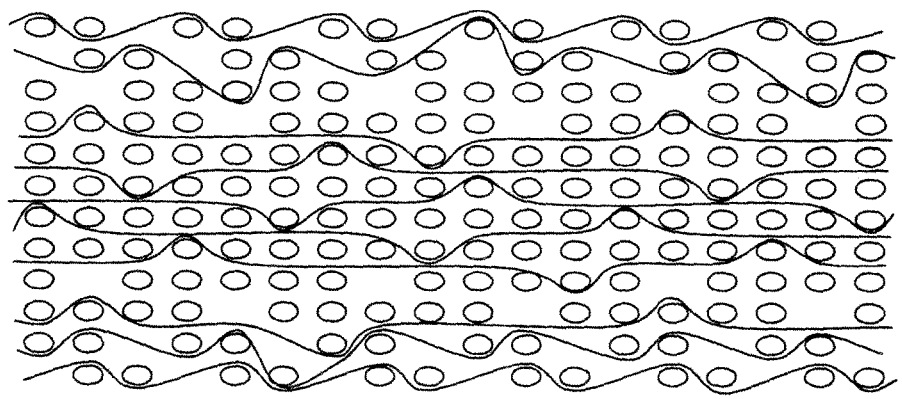
Figure 7I:
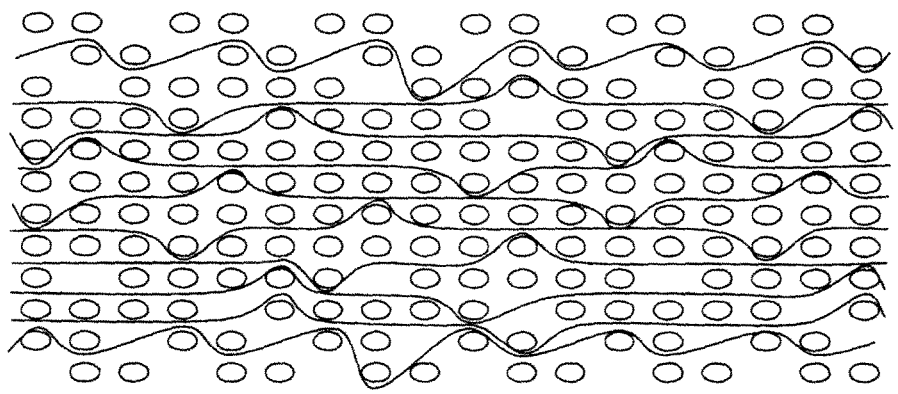
Figure 7J:
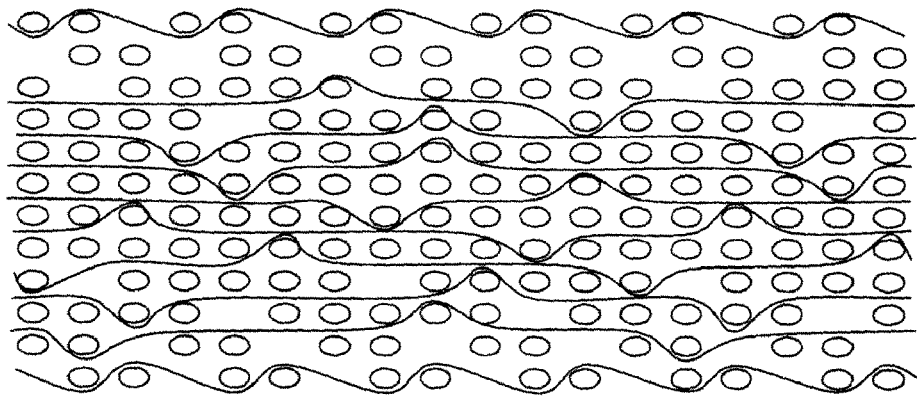
Figure 7K:
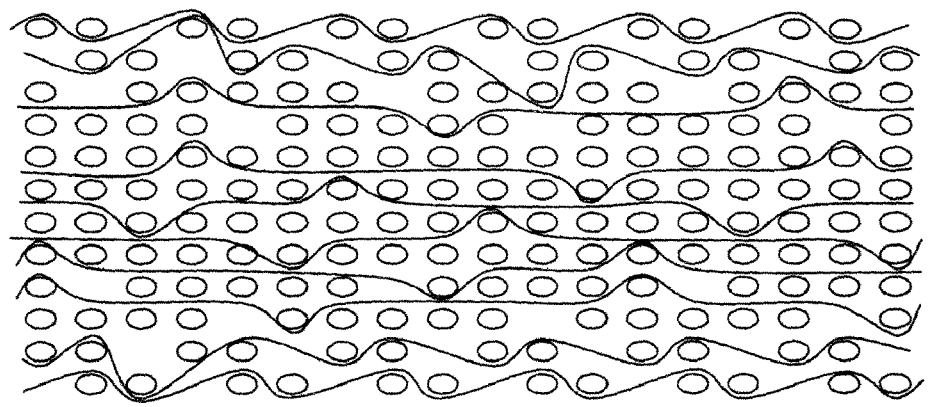
Figure 7L:
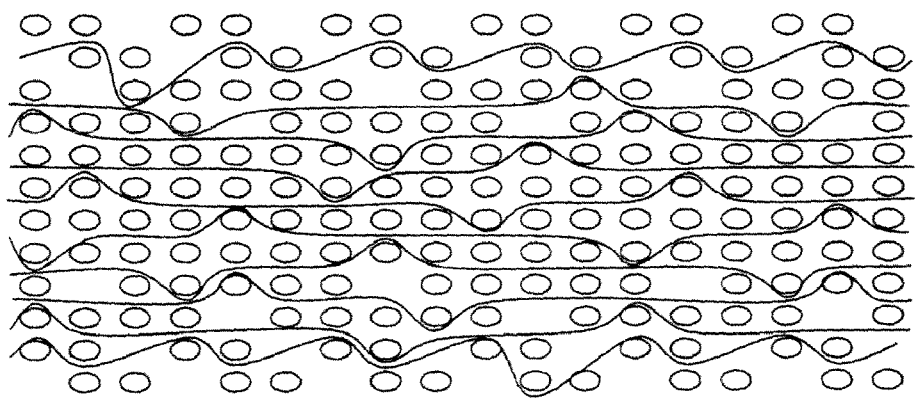

FIG. 3 shows a plane of a multilayer cloth of the satin type, or "multiple-satin cloth", wherein each warp yarn is deflected in alternation in one direction and in the other in order to take in alternation, one weft yarn in n in a first layer of weft yarns, and one weft yarn in n of a second layer of weft yarns adjacent to the first, n being an integer greater than 2, thereby bonding together the two layers by two satin interlacing points PS. In the example, n=16.

In a satin type weave, "pitch" designates the gap between two satin interlacing points of a given warp yarn measured as a number of weft columns. In the example of FIG. 3, this pitch alternates between 6 and 10, giving a mean multiple satin pitch of 8, n/2.

In the weaves of FIGS. 2 and 3, the weft yarns are not in a staggered configuration, the weft yarns of two adjacent weft yarn layers being aligned on the same columns. Nevertheless, it is possible to have a staggered weft arrangement as shown in FIG. 1, the interlace points being made between two adjacent weft half-layers.

It should be observed that an interlace using a single warp yarn in a multiple plain or multiple satin weave is not restricted to the two adjacent weft layers, but may extend over a depth of more than two weft layers.

The term "structure" is used herein to designate the number of yarns per unit length both in the weft direction and in the warp direction, so that a structure of low count (an open structure) has a smaller number of yarns per unit length, thereby producing a cloth that is more open, as compared with a structure of high count (a close structure).

By convention and for convenience, throughout the specification below and in the drawings, only those warp yarns that are deflected from their paths take hold of weft yarns of one or more weft layers are mentioned and shown. Nevertheless, it is possible to invert roles between warp and weft, and such inversion should be considered as also being covered by the claims.

DETAILED DESCRIPTION OF EMBODIMENTS OF THE INVENTION

The field of application of the invention is that of making thick fiber textures suitable for constituting fiber reinforcement, or preforms for use in fabricating composite material parts.

Making the fiber texture by 3D weaving makes it possible, in a single textile operation, to obtain interlinking between the layers, and thus to have a fiber texture and a resulting composite material part that present good mechanical behavior.

When the part is obtained by densifying the fiber texture at least in part by chemical vapor infiltration (CVI), and in order to obtain mechanical properties that are as uniform as possible within the part, it is advantageous to encourage densification with a densification gradient that is as small as possible between an inner portion or core of the fiber texture and an outer portion or skin thereof, i.e. a portion of the fiber texture that is adjacent to an outside surface.

For this purpose, and in order to encourage access of the reaction gas to the core of the preform during a CVI process, the core portion is woven with yarns that are made up, at least in the majority, from discontinuous fibers that enable porosity to be subdivided by the fibers bulking up. It is possible to use yarns made up from discontinuous fibers without twisting or with very little twisting, together with a sacrificial covering yarn that gives cohesion to the yarns, the discontinuous fibers forming the majority of the yarns even if the covering yarn is made of continuous filaments. It is also possible to use yarns made up from discontinuous fibers that are twisted together, known as discontinuous fiber yarns.

It is also advantageous to encourage obtaining a surface state, after densification, that is free from irregularities, i.e. a good state of finish so as to avoid or limit finishing operations by machining.

To this end, the skin is made by weaving yarns made up from continuous filaments so as to avoid any bulking up of discontinuous fibers. This applies to the layer of weft yarns defining the outer portion of the skin and possibly also one or more layers of the adjacent layers of weft yarns. This also preferably applies to the warp yarns that come flush to the surface of the skin.

In an embodiment of the invention, the core is made by three-dimensional weaving of the interlock type, and the skin is made by weaving with a plain, satin, or twill type weave. The interlock weaving in the core encourages access for the gas during a CVI process, since it provides easy communication between a plurality of layers of cloth. The weaving of the skin may comprise two-dimensional weaving with a plain, satin, or twill weave, the interlock weaving of the core portion then extending part way into the skin, or it may comprise multilayer weaving using a plain, satin, or twill type weave.

In another embodiment, the core and the skin are made by multilayer weaving using different weaves. The core may be made by multilayer weaving with a satin type weave and the skin by multilayer weaving with a plain or twill type weave.

Still for the purpose of encouraging access for the reaction gas, the skin may be made with a structure presenting a count that is lower than the count of the structure of the core.

It can also be desirable to use yarns of different chemical kinds in the core and in the skin in order to impart particular properties to the resulting composite material part, in particular properties that differ in terms of resistance to oxidation or to wear.

Thus, for a part made of thermostructural composite material with refractory fiber reinforcement, it is possible to make a preform with carbon fibers in the core and with ceramic fibers, e.g. silica carbide (SiC) fibers, in a skin so as to increase the wear resistance of the composite part in that skin.

Examples of fiber structures in accordance with the invention are described below. In all of these examples, the weaving is performed on a Jacquard type loom.

Example 1

FIGS. 4A to 4H show portions of eight successive planes of a weave of a fiber structure obtained by 3D weaving, the weft yarns being shown in section.

The fiber structure 10 comprises nine layers of weft yarns, i.e. 18 half-layers t1 to t18. In the core 12 situated between the opposite skins 14 and 16, the 3D weaving is of the interlock type with yarns made up in the majority from discontinuous carbon fibers held by a covering yarn sacrificial material, as described in EP 0 489 637, and with a 10/10 structure per layer (10 yarns per centimeter in both the weft and the warp directions). The covering yarn is constituted, for example, by a soluble polymer such as a polyvinyl alcohol or a polymer that can be eliminated by heat treatment without affecting the carbon of the fibers, such as a polyethylene or a polyvinyl acetate. In the skins 14 and 16, the weaving is two-dimensional with a plain type weave using yarns made up from continuous carbon filaments and with a 5/5 structure per layer. The interlacing by weaving with a plain weave applies only to the half-layers t1 and t2 and the half-layers t17 and t18 of the weft yarns. It should be observed that the interlock 3D weaving in the core extends as far as the weft half-layers t1 and t18 of the skins so as to bond these half-layers with the layers of the core.

In this example, the yarns made of continuous filaments are the yarns of the weft half-layers t1, t2, t17, and t18 and the warp yarns of the plain weaves at the surface, i.e. the warp yarns Ct1, Ct2 and the warp yarns Ct17, Ct18 in FIGS. 4A and 4B. The warp yarns of the interlock weaving that take hold of the yarns of the half-layers t1 and t18 and that therefore come flush with the surface of the skin could equally well be made of continuous filaments (warp yarns Ci1 and Ci3 in FIGS. 4B and 4A).

In this example, in addition to the type of yarn being varied between the core and the skin, the 3D weaving and the structure are also varied. The interlock 3D weaving and the use of yarns made up from discontinuous fibers in the core serve to minimize a CVI densification gradient between the skins and the core. A plain weave and the use of yarns made up from continuous filaments in the skin help to obtain a surface state that is relatively smooth, and a plain weave with a lower count structure in the skins encourages access for a reaction gas through the skins.

Example 2

FIGS. 5A to 5H show portions of successive planes of a fiber texture 20 obtained by 3D weaving, this texture differing from that of Example 1 in that multi-layer weaving is performed in the skins 24 and 26 with a weave analogous to a multiple plain weave over a thickness of two weft half-layers, the 3D weaving in the core portion 22 being of the interlock type with each warp yarn extending over a depth of three half-layers of weft yarns, the weft yarns being disposed in a staggered configuration.

When multi-layer weaving is performed in the skin, there is no need for the interlock weaving to cover all of the weft layers of the skin. It can suffice for a single weft layer or half-layer situated at the interface between the core and the skin to be involved both with the interlock weaving and with the multi-layer weaving in order to obtain interlacing by 3D weaving between all of the weft yarns. Nevertheless, in the example shown, the interlock weave involves all of the half-layers of weft yarns.

As in Example 2, the weaving in the core is performed with yarns made from discontinuous fibers held together by a sacrificial covering yarn, while the weaving in the skin is performed with yarns made up from continuous fibers. Thus, for example, in the embodiments shown in FIGS. 5A to 5H, the yarns made up from continuous filaments are the yarns in the weft yarn half-layers t1, t2, t17, and t18, together with the warp yarns of the multiple-plane weaving and of the interlock weaving that engages the yarns of the half-layers t1 and t18 (i.e. warp yarns Ct1, Ct8, Ci1, Ci8 in FIGS. 5B and 5C).

Example 3

FIGS. 6A to 6H show portions of successive weft planes in a texture 30 obtained by three-dimensional multi-layer weaving, this texture differing from that of Example 1 in that the same interlock 3D weaving is performed in the core 32 and in the skins 34 and 36.

In the core 32, the weaving is performed using yarns made up from discontinuous fibers united by a sacrificial covering yarn, whereas in the skins 34 and 36, i.e. over one or two extreme weft half-layers, the weaving is performed using yarns made up from continuous filaments. In the example shown, the yarns made up from continuous filaments are the yarns of the weft yarn half-layers t1, t1, t17, and t18, and the warp yarns that engage the yarns of the half-layers t1, t18 (warp yarns C1 and C7 in FIGS. 6B and 6A).

In this example only the type of yarn varies between the core and the skin.

Example 4

FIGS. 7A to 7L show successive layer planes of a texture 40 obtained by multi-layer 3D weaving, comprising 12 layers of weft yarns U1 to U12. The table below summarizes the weaves and the structures of the 3D weaving used, with the variation in the weave of the texture 40 being symmetrical about a midplane between its skins 44, 46 that are situated on either side of the core 42. It should be observed that the weft yarns are not disposed in a staggered configuration, but that certain weft layers have numbers of weft yarns that differ from the numbers in other weft layers (weft structure variation).

| Weft yarn layers | Multi-layer weave | Structure |
| --- | --- | --- |
| U1 | Plain | 6.6/6.6 |
| U2 | Multiple-plain | 6.6/6.6 |
| U3 | Multiple 5-satin | 8/8 |
| U4 | Multiple 5-satin | 8/8 |
| U5 | Multiple 6-satin | 10/10 |
| U6 | Multiple 6-satin | 10/10 |
| U7 | Multiple 6-satin | 10/10 |
| U8 | Multiple 6-satin | 10/10 |
| U9 | Multiple 5-satin | 8/8 |
| U10 | Multiple 5-satin | 8/8 |
| U11 | Multiple plain | 6.6/6.6 |
| U12 | Plain | 6.6/6.6 |

As can be seen in the figures, the multiple-satin weaving is performed by taking in alternation a weft yarn from a first layer and a weft yarn from a second layer adjacent to the first.

In the core portion 42 (corresponding to weft layers U3 to U10), the yarns used for the warp and the weft are yarns made up from discontinuous carbon fibers held together by a sacrificial covering yarn. In the skin portions 44, 46 (weft layers U1, U2 and U11, U12, the yarns are made up from continuous carbon filaments, i.e. the weft yarns U1, U2, U11, and U12 and the warp yarns in the plane and multiple-plane weaving.

Thus, in this example, the type of yarn, the multi-layer 3D weave, and the structure all vary between the core 42 and the skins 44, 46. It should be observed that the variation in the weave and in the structure is somewhat progressive by adopting a 5-satin for the weft layers U3, U4 and U9, U10, lying between the 6-satin of the layers U5 to U8 and the plain weave of the skins, so as to avoid having too sharp a discontinuity between the core and the skin.

A multiple-satin weave in the core gives rise to reduced warp shrinkage and better mechanical behavior parallel to the weft layers, particularly in the warp direction, in comparison with an interlock weave.

When densification is performed by CVI, a plain weave in the skin gives easier access to the gas through the skin, in comparison with a satin type weave.

Nevertheless, in a variant, it is possible to use a twill-type weave for weaving the skin.

Fiber textures as obtained by the method of the invention are suitable for making composite material parts that are obtained by densifying the fiber textures by CVI, in particular parts made of thermostructural composite material having fiber reinforcements constituted by carbon fibers and a matrix of carbon and/or of ceramic.

The invention claimed is:

1. A fiber texture for reinforcing a composite material part, the fiber texture being woven as a single part and having an inner portion, or core, and a portion adjacent to an outside surface, or skin, wherein the core is made by three-dimensional weaving with yarns that are made up, at least in the majority, from discontinuous fibers, and the skin is made by weaving with yarns made up from continuous filaments, wherein the weaving of the core portion is performed with yarns each made up from substantially twist-free discontinuous fibers together with at least one sacrificial covering yarn providing cohesion for the yarn.

2. A texture according to claim 1, wherein the core is made by three-dimensional weaving of the interlock type and the skin is made by weaving with a plain, satin, or twill type weave.

3. A texture according to claim 2, wherein the weaving of the skin comprises two-dimensional weaving with a plain, satin, or twill type weave and the interlock weaving of the core extends as far as the skin.

4. A texture according to claim 2, wherein the weaving of the skin comprises multi-layer three-dimensional weaving with a plain, satin, or twill type weave.

5. A fiber texture according to claim 1, wherein the core and the skin are made by multi-layer weaving with different weaves.

6. A fiber texture according to claim 5, wherein the core is made by multi-layer weaving with a satin type weave and the skin is made by three-dimensional weaving with a plain or twill type weave.

7. A texture according to claim 1, wherein the skin is made with a lower-count structure than that with which the core is made.

8. A texture according to claim 1, wherein the core and the skin of the fiber texture are made with yarns of different chemical natures.

9. A composite material part comprising a fiber reinforcing texture according to claim 1, densified by a matrix obtained at least in part by chemical vapor infiltration.

10. A composite material part comprising a fiber reinforcing texture according to claim 2, densified by a matrix obtained at least in part by chemical vapor infiltration.

11. A composite material part comprising a fiber reinforcing texture according to claim 3, densified by a matrix obtained at least in part by chemical vapor infiltration.

12. A composite material part comprising a fiber reinforcing texture according to claim 4, densified by a matrix obtained at least in part by chemical vapor infiltration.

13. A composite material part comprising a fiber reinforcing texture according to claim 5, densified by a matrix obtained at least in part by chemical vapor infiltration.

14. A composite material part comprising a fiber reinforcing texture according to claim 6, densified by a matrix obtained at least in part by chemical vapor infiltration.

15. A composite material part comprising a fiber reinforcing texture according to claim 7, densified by a matrix obtained at least in part by chemical vapor infiltration.

16. A composite material part comprising a fiber reinforcing texture according to claim 8, densified by a matrix obtained at least in part by chemical vapor infiltration.

* * * * *